United States Patent Office 3,454,788
Patented July 8, 1969

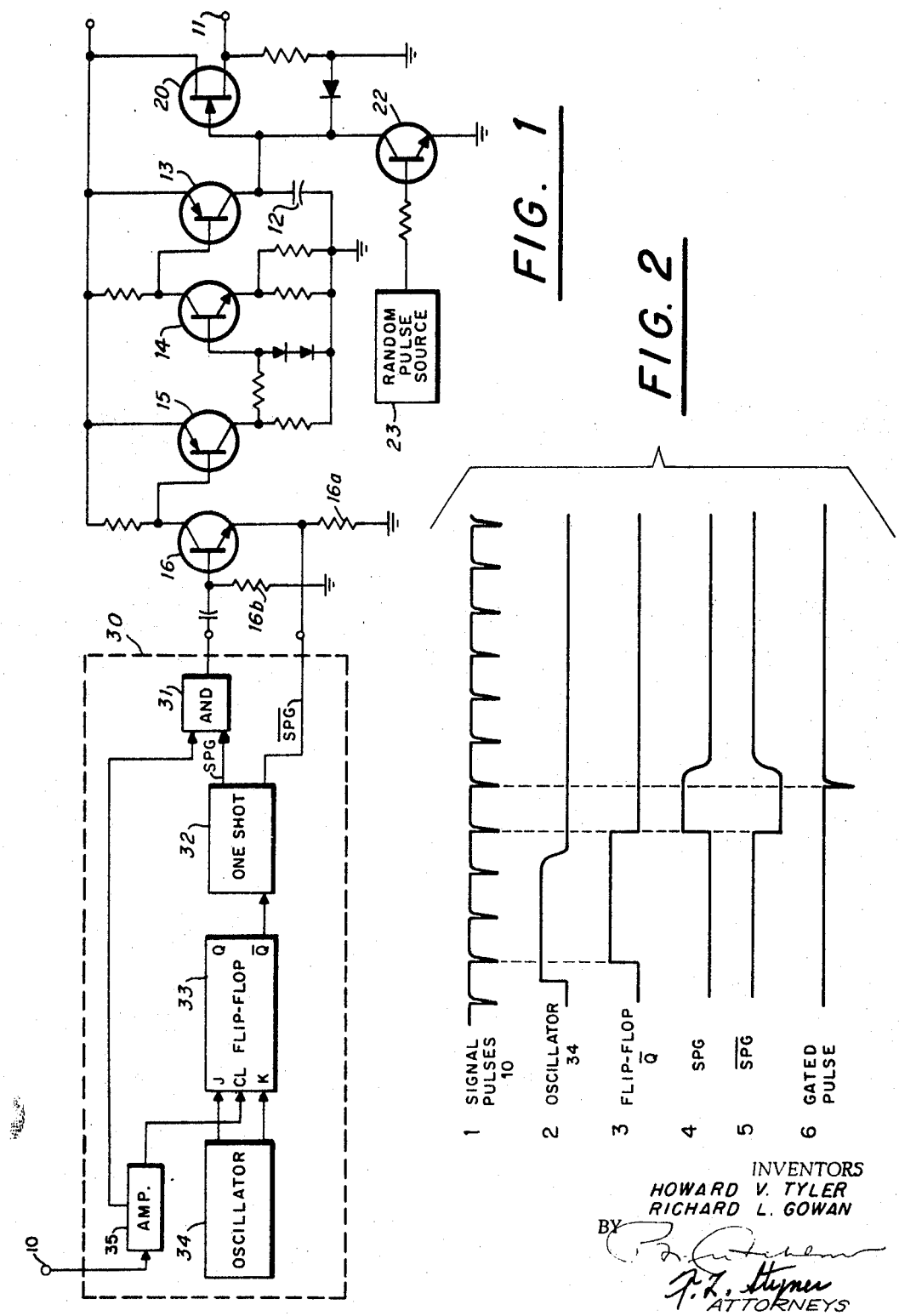

3,454,788
PULSE WIDTH SENSOR
Howard V. Tyler, San Diego, and Richard L. Gowan, Coronado, Calif., assignors to the United States of America as represented by the Secretary of the Navy
Filed Jan. 27, 1966, Ser. No. 523,468
Int. Cl. H03k 5/20
U.S. Cl. 307—234         3 Claims This invention is directed to means for measuring the width of an electrical pulse.

When the width of a pulse, of a series pulses, is to be measured the pulse must be isolated and, as usual, applied to a condenser for the purpose of charging the condenser an amount commensurate with the width of the pulse. It is prerequisite that the pulse be normalized in amplitude as by clipping. When a single pulse is involved and particularly when the single pulse is quite narrow, it is apparent that little energy is available to charge the condenser. This means that the condenser is quite vulnerable to any and all noise voltages that may be received.

The object of this invention is to provide an improved circuit for reliably generating a direct current voltage which is analogous to the width of a single narrow pulse and which is immune to the effects of spurious or noise voltages.

The object of this invention is obtained by charging a storage condenser with an amplifier which is squelched or biased to cut-off during all periods of time except during the period of the pulse to be measured. This is accomplished by a phase-splitter for simultaneously producing a positive-going and a negative-going pulse from the pulse to be measured. The two pulses are then applied, respectively, to the two input electrodes of the amplifier. One pulse unblocks the normally cut-off amplifier while the other pulse is amplified in the signal channel and applied to the storage condenser. The voltage across the storage condenser is then measured by a high impedance voltmeter.

Other objects and features of this invention will become apparent to those skilled in the art by referring to those skilled in the art by referring to the specific embodiment described in the following specification and shown in the accompanying drawing in which:

FIG. 1 shows a schematic wiring diagram of that one embodiment; and

FIG. 2 shows the time relations of important voltages of FIG. 1.

At 10 is shown a terminal for connection to a pulse source and at 30 is shown means for isolating without distortion a single pulse to be examined from among a series of pulses. One such isolating circuit is briefly described below and is fully disclosed in the copending application Ser. No. 520,315, filed Jan. 11, 1966. It is desired that a direct current voltage at output terminal 11 be produced which is proportional to the width of the single pulse derived from the source 10. It is assumed that the pulse received from source 10 has been leveled in amplitude so that amplitude variations of the pulse can be ignored.

At 12 is shown the storage condenser which preferably is of high quality and low leakage so as to accurately reflect the total charge fed into the condenser. Condenser 12 is connected across the bus bars of a DC voltage supply which preferably is regulated. In series with the condenser is the output circuit of the transistor amplifier 13. Transistor 13 is selected for its low leakage cut-off current and its high conduction current. The base of transistor 13 is driven by the cascaded amplifiers 16, 15 and 14.

Transistor amplifier 16 is of the common emitter configuration. According to an important feature of this invention, means are provided for applying signals separately to the two input electrodes of the amplifier. Emitter follower resistance 16a is connected between the emitter and ground, while resistance 16b is connected between the base and ground. Now, separate signals can be applied to the base and the emitter. The bias voltages are so adjusted that the transistor 16 is normally cut-off. Next, the two input electrodes of transistor 16 are driven, respectively, with the two outputs of the pulse isolator 30. The two output terminals of the pulse isolator are connected, respectively, to the two input electrodes of transistor 16. Resistances 16a and 16b serve as coupling impedances.

The specific pulse isolator 30 shown in FIG. 1 comprises an AND gate 31 which is normally closed to block the passage of any signal from the input 10. The control circuit of the AND gate is derived from the monostable or one-shot multivibrator 32. The signal pulse gate voltage SPG is applied to the control circuit of the AND gate while the complement of the SPG signal or $\overline{SPG}$, is derived from the second output of the multivibrator and is applied as a bias voltage to the amplifier 16. The duration of the unstable set state of the multivibrator 32 is adjustable and, as explained in the copending application Ser. No. 520,315, the duration is slightly more than the expected interval between pulses received at test terminal 10, and is so timed as to insure the passage of one pulse only from the input to the output terminals of the signal path of the gate. Initiation of the set state of the multivibrator is accomplished with the JK flip-flop 33 which is a flip-flop commercially obtainable under that name. The clock circuit, CL, of the flip-flop is controlled by the incoming series of pulses received through amplifier 35. The flip-flop changes state only once in response to the first clock pulse after the application of complementary voltages to the J and K terminals. The J and K voltages are randomly applied from the free-running oscillator 34.

Reference to FIG. 2 will illustrate the mode of operation of the specific embodiment shown in FIG. 1. On line 1 is represented the series of pulses appearing on the test terminal 10 while on line 2 is shown the waveform of the output of the oscillator 34 which, as stated, is free-running and occurs at random with respect to the signal pulses of line 1. The logic of the JK flip-flop 33 is such that a change in output voltage $\overline{Q}$ occurs only upon the receipt of a signal pulse at CL. The negative-going output $\overline{Q}$, shown on line 3 of FIG. 2, initiates the signal pulse gate SPG on a set voltage of the one shot or monostable multivibrator 32, as shown on line 4. The complementary output voltage SPG and $\overline{SPG}$ are shown on lines 4 and 5 of FIG. 2. Signal $\overline{SPG}$, of line 5, FIG. 2, is applied to the emitter of amplifier 16 and is of such a polarity and amplitude as to unblock the normally cut-off amplifier 16.

It is significant that amplifier 16 shall normally be biased well beyond cut-off so as to insure that no spurious signal will find its way through the amplifiers to the storage condenser 12. It is significant, further, that the unblocking voltage $\overline{SPG}$ is precisely synchronized with the enabling voltage SPG for gate 31 which admits the single pulse from the source 10 to the base of amplifier 16 and hence to the condenser 12. The charge on condenser 12, thus, is a function only of the width of the single isolated pulse and is not affected by noise.

The field effect transistor 20 has been found desirable to read out the voltage across condenser 12. The gate circuit is of very high impedance and yet effectively controls the current between the drain and source electrodes of the transistor. The load resistor 21 in series with the source electrode generates the output direct current voltage, $E_o$ at terminal 11. Condenser 12 may be short circuited at regular or irregular intervals by transistor 22, which is driven by the random pulse source 23.

The component values appearing on the drawing are representative of the values which work well in the measuring circuit of this invention. Many modifications and variations can, of course, be made in these parameters without departing from the scope of this invention defined in the appended claims.

What is claimed is:

1. A digital-to-analog converter for generating a direct current voltage proportional in amplitude to the width of a single pulse derived from a series of pulses, said converter comprising:
   a storage condenser with a direct current source and switch means for charging said condenser,
   an amplifier for driving said switch means,
   an AND gate with a signal path connected between the source of said series of pulses and said amplifier and a control circuit for selectively enabling and blocking said signal path of the gate,
   a monostable multivibrator with one output terminal coupled to said control circuit for generating a set unblocking voltage of a duration sufficient to enable the passage of one signal pulse only from said source to said amplifier, and
   means responsive to the other output terminal of said multivibrator for normally biasing said amplifier beyond cut-off and for removing the cut-off bias during the enabling period of said gate to protect said condenser from spurious charge voltages.

2. In the digital-to-analog converter defined in claim 1 said amplifier comprising a transistor with a base electrode coupled to the output of said AND gate and with an emitter electrode coupled to said other output terminal of said monostable multivibrator.

3. The connector defined in claim 1 further comprising a field effect transistor with a gate electrode, a drain electrode and a source electrode, with said gate electrode connected to one terminal of said condenser, and with the drain and source electrodes connected in series with a load resistor across said direct current source for measuring the charge voltage of said condenser.

References Cited

UNITED STATES PATENTS

| | | | |
|---|---|---|---|
| 2,698,382 | 11/1954 | Uglow | 328—95 |
| 3,166,678 | 1/1965 | Fleshman | 307—247 |
| 3,200,264 | 8/1965 | Lindenthal | 307—247 |
| 3,211,924 | 10/1965 | Beck | 307—246 |
| 3,226,577 | 12/1965 | Azuma | 307—273 |
| 3,270,288 | 8/1966 | Hackett | 307—217 |

ARTHUR GAUSS, *Primary Examiner.*

H. A. DIXON, *Assistant Examiner.*

U.S. Cl. X.R.

307—273